United States Patent
Yu et al.

(10) Patent No.: US 11,570,665 B2
(45) Date of Patent: Jan. 31, 2023

(54) COMMUNICATION METHOD AND COMMUNICATIONS APPARATUS

(71) Applicant: Huawei Technologies Co., Ltd., Shenzhen (CN)

(72) Inventors: Fang Yu, Beijing (CN); Yan Li, Beijing (CN); Hui Ni, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 21 days.

(21) Appl. No.: 17/133,031

(22) Filed: Dec. 23, 2020

(65) Prior Publication Data

US 2021/0120459 A1 Apr. 22, 2021

Related U.S. Application Data

(63) Continuation of application No. PCT/CN2019/092754, filed on Jun. 25, 2019.

(30) Foreign Application Priority Data

Jun. 25, 2018 (CN) .......................... 201810660940.1

(51) Int. Cl.
*H04W 36/00* (2009.01)
*H04W 36/14* (2009.01)

(52) U.S. Cl.
CPC ... *H04W 36/0016* (2013.01); *H04W 36/0055* (2013.01); *H04W 36/14* (2013.01)

(58) Field of Classification Search
CPC ............. H04W 36/00; H04W 36/0016; H04W 36/0055; H04W 36/026; H04W 36/08; H04W 36/14; H04W 36/18; H04W 24/02
See application file for complete search history.

(56) References Cited

U.S. PATENT DOCUMENTS

2009/0141684 A1 6/2009 Hashimoto et al.
2015/0215834 A1 7/2015 Qi et al.
(Continued)

FOREIGN PATENT DOCUMENTS

CN 1933661 A 3/2007
CN 1997220 A 7/2007
(Continued)

OTHER PUBLICATIONS

Ericsson,"User plane handling in case of IRAT mobility," 3GPP TSG-RAN WG3 #55, St. Louis, Missouri, USA, R3-070148, total 9 pages, 3rd Generation Partnership Project, Valbonne, France (Feb. 12-16, 2007).
(Continued)

*Primary Examiner* — Ankur Jain
(74) *Attorney, Agent, or Firm* — Leydig, Voit & Mayer, Ltd.

(57) ABSTRACT

According to a communication method and a communications apparatus, in a process in which an access network device serving a terminal is handed over from a source access network device to a target access network device, a user plane function network element may transmit first information to the source access network device. The first information is used to indicate that the user plane function network element bicasts downlink packets to the source access network device and the target access network device, so that after determining that a data packet received before the first information is sent to the terminal, the source access network device triggers an air interface handover, to avoid a packet loss in a handover process, or so that the source access network device synchronizes a PDCP SN of the source access network device with a PDCP SN of the target access network device.

14 Claims, 10 Drawing Sheets

(56) References Cited

U.S. PATENT DOCUMENTS

2015/0282035 A1    10/2015   Xia et al.
2019/0268815 A1*   8/2019   Zhu .................. H04W 36/0066

FOREIGN PATENT DOCUMENTS

| | | |
|---|---|---|
| CN | 101022652 A | 8/2007 |
| CN | 101207848 A | 6/2008 |
| CN | 102413520 A | 4/2012 |
| CN | 104521166 A | 4/2015 |
| EP | 3761703 A1 | 1/2021 |
| KR | 20110017633 A | 2/2011 |
| WO | 2018085727 A1 | 5/2018 |

OTHER PUBLICATIONS

"3rd Generation Partnership Project; Technical Specification Group Services and System Aspects; Procedures for the 5G System; Stage 2 (Release 15)," 3GPP TS 23.502 V15.2.0, total 308 pages, 3rd Generation Partnership Project, Valbonne, France (Jun. 2018).

"3rd Generation Partnership Project; Technical Specification Group Radio Access Network; NR; NR and NG-RAN Overall Description; Stage 2 (Release 15)," 3GPP TS 38.300 V15.2.0, total 87 pages, 3rd Generation Partnership Project, Valbonne, France (Jun. 2018).

"3rd Generation Partnership Project; Technical Specification Group Radio Access Network; Study on Scenarios and Requirements for Next Generation Access Technologies; (Release 14)," 3GPP TR 38.913 V14.3.0, total 39 pages, 3rd Generation Partnership Project, Valbonne, France (Jun. 2017).

* cited by examiner

COMMUNICATION METHOD AND COMMUNICATIONS APPARATUS

CROSS-REFERENCE TO RELATED APPLICATIONS

This application is a continuation of International Application No. PCT/CN2019/092754, filed on Jun. 25, 2019, which claims priority to Chinese Patent Application No. 201810660940.1, filed on Jun. 25, 2018. The disclosures of the aforementioned applications are hereby incorporated by reference in their entireties.

TECHNICAL FIELD

Embodiments of this application relate to the communications field, and more specifically, to a communication method and a communications apparatus.

BACKGROUND

In a communications network, in some scenarios, for example, when quality of communication between a radio access network (RAN) device currently serving a terminal device, such as a user equipment (UE) and the UE is relatively poor, the UE needs to be handed over to another RAN device. The RAN device before the handover may be referred to as a source radio access network (source-RAN, S-RAN) device, and the RAN device after the handover may be referred to as a target radio access network (target-RAN, T-RAN) device.

Based on a requirement of the communications network on a latency of a downlink data packet, for example, in an ultra-reliable and low-latency communications (URLLC) scenario of a 5th generation (5G) communications system, the latency of the downlink data packet in a RAN device handover process needs to be reduced.

A currently proposed method for reducing the latency of the downlink data packet in the RAN device handover process includes: Before a RAN device is handed over, a path between a T-RAN device and a user plane function (UPF) network element is established in advance, and the UPF network element bicasts downlink data to an S-RAN device and the T-RAN device at the same time. In this way, in a handover execution stage, the S-RAN device does not need to forward the downlink data packet of the UE to the T-RAN device, so that a transmission latency of the downlink data packet can be reduced.

In the method, when the S-RAN device triggers an air interface handover of the UE, downlink packets before the UPF network element starts to bicast may not be sent to the UE. Consequently, a packet loss is caused.

SUMMARY

This application provides a communication method and a communications apparatus, to help avoid a packet loss in a process in which an S-RAN device triggers an air interface handover of UE, or help implement a packet data convergence protocol sequence number (PDCP SN) synchronization between the S-RAN and a T-RAN.

According to a first aspect, this application provides a communication method. The communication method includes: In a process in which an access network device serving a terminal is handed over from a source access network device to a target access network device, a user plane function network element determines to bicast downlink packets to the source access network device and the target access network device. The user plane function network element sends first information to the source access network device. The first information is used to indicate that the user plane function network element bicasts the downlink packets to the source access network device and the target access network device.

In the communication method, the user plane function network element sends the first information to the source access network device when determining to bicast the downlink packets to the source access network device and the target access network device, where the first information is used to indicate that the user plane function network element bicasts the downlink packets to the source access network device and the target access network device. In this way, the source access network device can trigger an air interface handover of UE after sending the downlink packets received before the first information to the UE, to avoid a packet loss caused by that an S-RAN device no longer forwards a downlink data packet of the UE to a T-RAN device in a handover process.

In addition, the user plane function network element sends the first information to the source access network device when determining to bicast the downlink packets to the source access network device and the target access network device, where the first information is used to indicate that the user plane function network element bicasts the downlink packets to the source access network device and the target access network device. In this way, the source access network device can further indicate PDCP SNs of the downlink packets to the target access network device based on the first information, so that PDCP SN synchronization between the S-RAN and the T-RAN is implemented.

With reference to the first aspect, in a first possible implementation, that the user plane function network element sends first information to the source access network device includes:

The user plane function network element bicasts the downlink packets to the source access network device and the target access network device. The downlink packets bicast by the user plane function network element to the source access network device include the first information.

In this implementation, carrying the first information in the bicast downlink packets, compared with carrying the first information in a new packet or message, helps reduce complexity of communication between the user plane function network element and the source access network device, and does not additionally add a packet that is exchanged between the user plane function network element and the source access network device, which helps reduce a packet transmission latency.

With reference to the first possible implementation, in a second possible implementation, the first N downlink packets bicast by the user plane function network element to the source access network device all carry the first information, and N is a positive integer.

When N is greater than 1, this implementation can improve reliability of receiving the first information by the source access network device.

With reference to the first aspect, in a third possible implementation, the communication method further includes:

The user plane function network element bicasts the downlink packets to the source access network device and the target access network device after sending the first information.

According to a second aspect, this application provides a communication method. The communication method includes:

In a process in which an access network device serving a terminal is handed over from a source access network device to a target access network device, the source access network device receives first information from a user plane function network element, where the first information is used to indicate that the user plane function network element bicasts downlink packets to the source access network device and the target access network device; and the source access network device sends second information to the target access network device, where the second information is used to determine packet data convergence protocol sequence numbers of downlink data in the downlink packets.

The source access network device sends, to the target access network device based on the first information, the second information indicating the PDCP SNs of the downlink packets, so that PDCP SN synchronization between the S-RAN and the T-RAN can be implemented.

With reference to the second aspect, in a first possible implementation, the communication method further includes:

The source access network device triggers an air interface handover after sending a data packet received before the first information to the terminal.

With reference to the first possible implementation, in a second possible implementation, that the source access network device triggers an air interface handover includes:

The source access network device sends a handover command message to the terminal; or the source access network device stops sending downlink data to the terminal.

With reference to the second aspect or the first or the second possible implementation, in a third possible implementation, that the source access network device receives first information from a user plane function network element includes:

The source access network device receives the downlink packets bicast by the user plane function network element to the source access network device and the target access network device. The downlink packets bicast by the user plane function network element to the source access network device include the first information.

With reference to the third possible implementation, in a fourth possible implementation, the first N downlink packets bicast by the user plane function network element to the source access network device all carry the first information, and N is a positive integer.

With reference to the second aspect or the first or the second possible implementation, in a fifth possible implementation, the communication method further includes:

The source access network device receives, after receiving the first information, the downlink packets bicast by the user plane function network element to the source access network device and the target access network device.

With reference to any one of the second aspect or the first to the fifth possible implementations, in a sixth possible implementation, the communication method further includes:

The source access network device starts to detect whether the first information is received, after receiving a handover command from an access and mobility management function network element, or after sending a handover required message to the access and mobility management function network element.

According to a third aspect, this application provides a communication method. The communication method includes:

In a process in which an access network device serving a terminal is handed over from a source access network device to a target access network device, the source access network device receives first information from a user plane function network element, where the first information is used to indicate that the user plane function network element bicasts downlink packets to the source access network device and the target access network device; and the source access network device triggers an air interface handover after sending a data packet received before the first information to the terminal.

In the communication method, the source access network device receives, from the user plane function, the first information indicating the user plane function network element to bicast the downlink packets to the source access network device and the target access network device, so that the source access network device can trigger an air interface handover of UE after sending, based on the first information, a downlink packet received before the first information to the UE. In this way, it is ensured that, before the terminal device is handed over to the target access network device, the source access network device has sent the packet that is before the bicast starts to the terminal device, to avoid a packet loss caused by that an S-RAN device no longer forwards a downlink data packet of the UE to a T-RAN device in a handover process.

With reference to the third aspect, in a first possible implementation, that the source access network device triggers an air interface handover includes:

The source access network device sends a handover command message to the terminal; or the source access network device stops sending downlink data to the terminal.

With reference to the third aspect or the first possible implementation, in a second possible implementation, that the source access network device receives first information from a user plane function network element includes:

The source access network device receives the downlink packets bicast by the user plane function network element to the source access network device and the target access network device. The downlink packets bicast by the user plane function network element to the source access network device include the first information.

In this implementation, carrying the first information in the bicast downlink packets does not additionally add a packet that is exchanged between the user plane function network element and the source access network device, which helps reduce a packet transmission latency.

With reference to the second possible implementation, in a third possible implementation, the first N downlink packets bicast by the user plane function network element to the source access network device all carry the first information, and N is a positive integer.

When N is greater than 1, this implementation can improve reliability of receiving the first information by the source access network device.

With reference to the third aspect or the first possible implementation, in a fourth possible implementation, the communication method further includes:

The source access network device receives, after receiving the first information, the downlink packets bicast by the user plane function network element to the source access network device and the target access network device.

With reference to any one of the third aspect or the possible implementations, in a fifth possible implementation, the communication method further includes:

The source access network device sends second information to the target access network device after receiving the first information from the user plane function network element, where the second information is used to determine packet data convergence protocol sequence numbers of downlink data in the downlink packets.

With reference to any one of the third aspect or the possible implementations, in a sixth possible implementation, the communication method further includes:

The source access network device starts to detect whether the first information is received, after receiving a handover command from an access and mobility management function network element, or after sending a handover required message to the access and mobility management function network element.

According to a fourth aspect, this application provides a communication method. The communication method includes:

In a process in which an access network device serving a terminal is handed over from a source access network device to a target access network device, the target access network device receives, from a user plane function network element, downlink packets bicast by the user plane function network element to the source access network device and the target access network device;

the target access network device receives second information from the source access network device, where the second information is used to determine packet data convergence protocol sequence numbers of downlink data in the downlink packets; and the target access network device generates packet data convergence protocol packets based on the second information and the downlink packets.

In the communication method, the target access network device may receive the PDCP SNs from the source access network device, and generate packet data convergence protocol (PDCP) packets based on the PDCP SNs.

In a possible implementation, the communication method further includes: The target access network device buffers the downlink packets before receiving the second information.

According to a fifth aspect, a communications apparatus is provided. The communications apparatus includes a module configured to perform the communication method according to any one of the first aspect or the possible implementations of the first aspect.

According to a sixth aspect, a communications apparatus is provided. The communications apparatus includes a module configured to perform the communication method according to any one of the second aspect or the possible implementations of the second aspect.

According to a seventh aspect, a communications apparatus is provided. The communications apparatus includes a module configured to perform the communication method according to any one of the third aspect or the possible implementations of the third aspect.

According to an eighth aspect, a communications apparatus is provided. The communications apparatus includes a module configured to perform the communication method according to any one of the fourth aspect or the possible implementations of the fourth aspect.

According to a ninth aspect, a communications apparatus is provided, and the communications apparatus includes a processor and a transmitter. The processor is configured to execute a program, and when the processor executes the program, the processor and the transmitter implement the communication method according to any one of the first aspect or the possible implementations of the first aspect.

Optionally, the communications apparatus may further include a memory. The memory is configured to store the program executed by the processor.

Optionally, the communications apparatus may further include a receiver. The receiver is configured to receive information from another device or apparatus.

An example of the communications apparatus is a user plane function network element.

According to a tenth aspect, a communications apparatus is provided, and the communications apparatus includes a processor, a transmitter, and a receiver. The processor is configured to execute a program, and when the processor executes the program, the processor, the transmitter, and the receiver implement the communication method according to any one of the second aspect or the possible implementations of the second aspect.

Optionally, the communications apparatus may further include a memory. The memory is configured to store the program executed by the processor.

An example of the communications apparatus is an access network device.

According to an eleventh aspect, a communications apparatus is provided, and the communications apparatus includes a processor and a receiver. The processor is configured to execute a program, and when the processor executes the program, the processor and the receiver implement the communication method according to any one of the third aspect or the possible implementations of the third aspect.

Optionally, the communications apparatus may further include a memory. The memory is configured to store the program executed by the processor.

Optionally, the communications apparatus may further include a transmitter. The transmitter is configured to send information to another device or apparatus.

An example of the communications apparatus is an access network device.

According to a twelfth aspect, a communications apparatus is provided, and the communications apparatus includes a processor and a receiver. The processor is configured to execute a program, and when the processor executes the program, the processor and the receiver implement the communication method according to any one of the fourth aspect or the possible implementations of the fourth aspect.

Optionally, the communications apparatus may further include a memory. The memory is configured to store the program executed by the processor.

Optionally, the communications apparatus may further include a transmitter. The transmitter is configured to send information to another device or apparatus.

An example of the communications apparatus is an access network device.

According to a thirteenth aspect, a computer-readable storage medium is provided. The computer-readable storage medium stores program code executed by a communications apparatus or a communications device, and the program code includes an instruction that is used to implement the communication method according to any one of the first aspect or the possible implementations of the first aspect.

According to a fourteenth aspect, a computer-readable storage medium is provided. The computer-readable storage medium stores program code executed by a communications apparatus or a communications device, and the program code includes an instruction that is used to implement the communication method according to any one of the second aspect or the possible implementations of the second aspect.

According to a fifteenth aspect, a computer-readable storage medium is provided. The computer-readable storage medium stores program code executed by a communications apparatus or a communications device, and the program code includes an instruction that is used to implement the communication method according to any one of the third aspect or the possible implementations of the third aspect.

According to a sixteenth aspect, a computer-readable storage medium is provided. The computer-readable storage medium stores program code executed by a communications apparatus or a communications device, and the program code includes an instruction that is used to implement the communication method according to any one of the fourth aspect or the possible implementations of the fourth aspect.

According to a seventeenth aspect, a chip is provided. The chip includes a processor and a communications interface. The communications interface is configured to communicate with an external device. The processor is configured to implement the communication method according to any one of the first aspect or the possible implementations of the first aspect.

Optionally, the chip may further include a memory. The memory stores an instruction. The processor is configured to execute the instruction stored in the memory. When the instruction is executed, the processor is configured to implement the communication method according to any one of the first aspect or the possible implementations of the first aspect.

Optionally, the chip may be integrated into a user plane function network element.

According to an eighteenth aspect, a chip is provided. The chip includes a processor and a communications interface. The communications interface is configured to communicate with an external device. The processor is configured to implement the communication method according to any one of the second aspect or the possible implementations of the second aspect.

Optionally, the chip may further include a memory. The memory stores an instruction. The processor is configured to execute the instruction stored in the memory. When the instruction is executed, the processor is configured to implement the communication method according to any one of the second aspect or the possible implementations of the second aspect.

Optionally, the chip may be integrated into an access network device.

According to a nineteenth aspect, a chip is provided. The chip includes a processor and a communications interface. The communications interface is configured to communicate with an external device. The processor is configured to implement the communication method according to any one of the third aspect or the possible implementations of the third aspect.

Optionally, the chip may further include a memory. The memory stores an instruction. The processor is configured to execute the instruction stored in the memory. When the instruction is executed, the processor is configured to implement the communication method according to any one of the third aspect or the possible implementations of the third aspect.

Optionally, the chip may be integrated into an access network device.

According to a twentieth aspect, a chip is provided. The chip includes a processor and a communications interface. The communications interface is configured to communicate with an external device. The processor is configured to implement the communication method according to any one of the fourth aspect or the possible implementations of the fourth aspect.

Optionally, the chip may further include a memory. The memory stores an instruction. The processor is configured to execute the instruction stored in the memory. When the instruction is executed, the processor is configured to implement the communication method according to any one of the third aspect or the possible implementations of the third aspect.

Optionally, the chip may be integrated into an access network device.

DESCRIPTION OF EMBODIMENTS

The following describes technical solutions in this application with reference to accompanying drawings.

Figure 1:
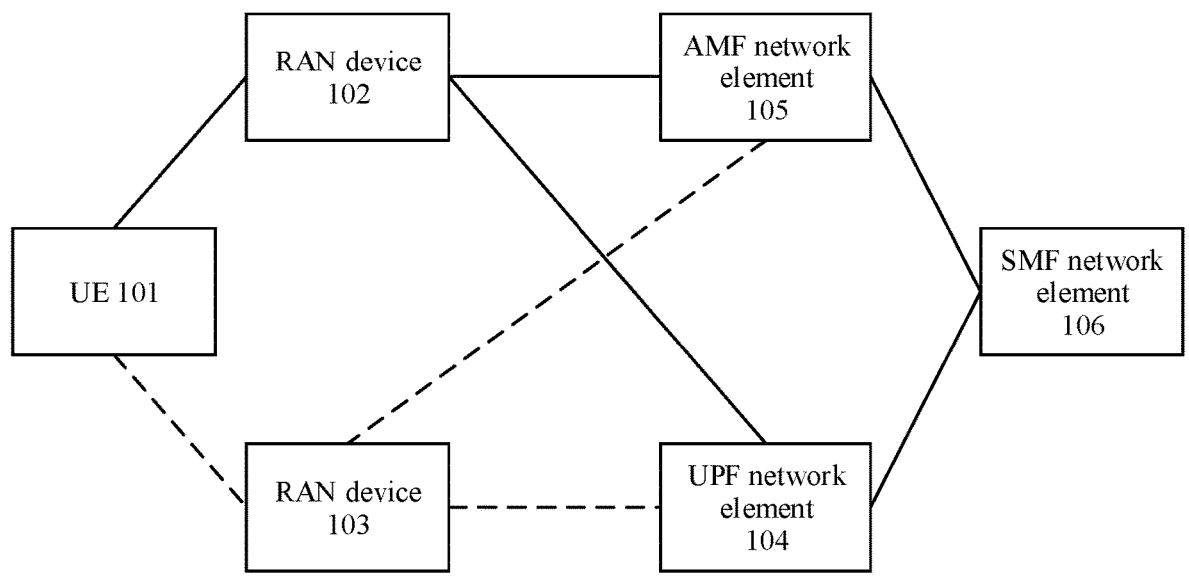
FIG. 1 is a schematic diagram of an application scenario to which a communication method according to an embodiment of this application may be applied.

As shown in FIG. 1, an application scenario to which a communication method according to an embodiment of this application may be applied may include UE 101, a RAN device 102, a RAN device 103, a UPF network element 104, an access and mobility management function (AMF) network element 105, and a session management function (SMF) network element 106.

UE may also be referred to as a terminal device. The terminal device may communicate with one or more core networks (core network, CN) by using a RAN device. The terminal device may also be referred to as an access terminal, a terminal, a subscriber unit, a subscriber station, a mobile station, a mobile station, a remote station, a remote terminal, a mobile device, a user terminal, a wireless network device, a user agent, or a user apparatus. The terminal may be a cellular phone, a cordless phone, a session initiation protocol (SIP) phone, a wireless local loop (WLL) station, a personal digital assistant (PDA), a handheld device having a wireless communication function, a computing device, another device connected to a wireless modem, a vehicle-mounted device, a wearable device, a terminal device in an internet of things, a terminal device in an internet of vehicles, any form of terminal device in a future network, or the like.

An example of a RAN device is a base station (BS). The base station may also be referred to as base station equipment, is a device that connects the terminal to a wireless network, and includes but is not limited to: a transmission reception point (TRP), a 5G NodeB (gNB), an evolved NodeB (evolved node B, eNB), a radio network controller (RNC), a NodeB (node B, NB), a base station controller (BSC), a base transceiver station (BTS), a home base station (for example, a home evolved nodeB or a home node B, HNB), a base band unit (BBU), a Wi-Fi access point (AP), a pico base station (pico), or the like.

It should be understood that a specific type of the base station is not limited in this specification. In systems using different radio access technologies, names of devices having functions of the base station may be different. For ease of description, in all embodiments of this application, the foregoing apparatuses that provide a wireless communication function to the terminal are collectively referred to as base stations.

A UPF network element has functions such as packet forwarding, encapsulation, and statistics collection of the terminal device.

An AMF network element is responsible for access and mobility management of the terminal device. For example, the AMF network element is responsible for UE location update, registration of the UE with a network, or UE handover.

An SMF network element is responsible for selection and reselection of the UPF network element, assignment of an internet protocol (IP) address, and the like, and may be further responsible for session establishment, modification, release, and the like.

It should be understood that the embodiments of this application are not limited to a system architecture shown in FIG. 1. For example, a communications system to which the communication method in this embodiment of this application may be applied may include more or fewer network elements or devices. The devices or the network elements in FIG. 1 may be hardware, or may be software obtained through functional division, or a combination thereof. The devices or the network elements in FIG. 1 may communicate with each other by using another device or network element.

In a communications system shown in FIG. 1, the UE 101 currently communicates, to be specific, transmits an uplink data packet and a downlink data packet, with the UPF network element 104 by using the RAN device 102.

In some scenarios, the UE 101 needs to be handed over from the RAN device 102 to the RAN device 103. For example, the RAN device 102 may determine, based on a measurement report reported by the UE 101, to hand over the UE 101 to the RAN device 103. That is, the UE 101 communicates with the UPF network element 104 or another UPF network element by using the RAN device 103. The RAN device 102 may be referred to as an S-RAN device, namely, a source access network device. The RAN device 103 may be referred to as a T-RAN device, namely, a target access network device.

After it is determined that the UE 101 needs to be handed over from the RAN device 102 to the RAN device 103, the RAN device 102 may complete interaction with the RAN device 103, so that the RAN device 103 determines a packet data unit (packet data unit, PDU) session that allows to be handed over and a quality of service (quality of service, QoS) flow (flow) that is included in the PDU session.

In addition, the RAN device 102 provides information about the RAN device 103 to the AMF network element 105. The information about the RAN device 103 may include an identity (ID) and N3 tunnel information (tunnel Info) of the RAN device 103. The N3 tunnel information is used to establish a data transmission tunnel between the UPF network element and the RAN device 103. After obtaining the N3 tunnel information of the RAN device 103, the UPF may send a downlink packet to the RAN device 103 based on the tunnel information.

The AMF network element 105 provides the information about the RAN device 103 to the SMF network element 106, and then the SMF network element 106 delivers indication information or a forwarding rule to the UPF network element 104 (certainly, may alternatively be another UPF network element) based on the information about the RAN device 103. The indication information or the forwarding rule is used to indicate the UPF network element 104 to process and forward the uplink data packet and/or the downlink data packet. In this embodiment of this application, the SMF network element may indicate, in the indication information or the forwarding rule, the UPF network element 104 to start to bicast downlink packets to the RAN device 102 and the RAN device 103 after receiving the indication information or the forwarding rule.

The AMF network element 105 not only provides the information about the RAN device 103 to the SMF network element 106, but also sends a handover command to the RAN device 102 to trigger the RAN device to perform an air interface handover.

Figure 2:
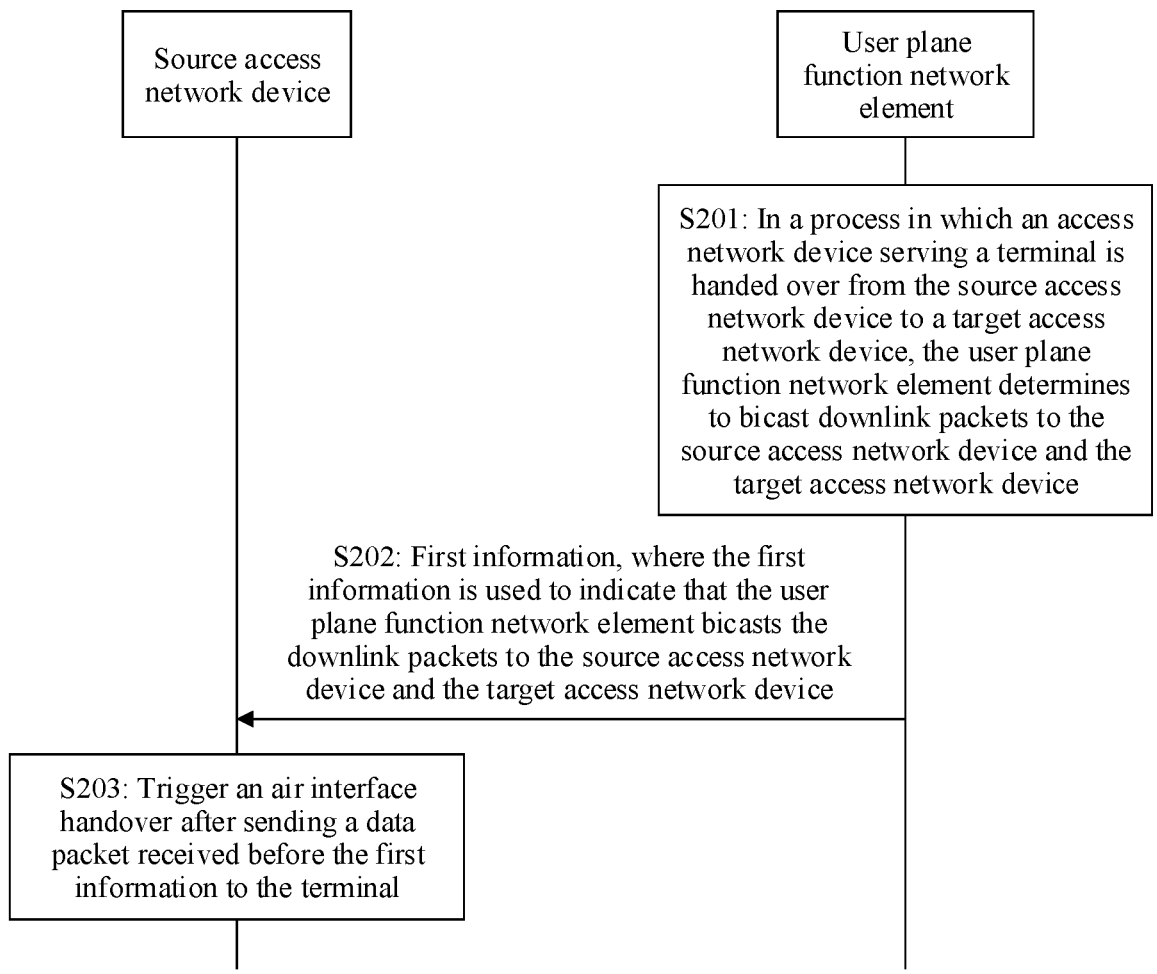
FIG. 2 is a schematic flowchart of a communication method according to an embodiment of this application.

FIG. 2 is a schematic flowchart of a communication method according to an embodiment of this application. The method shown in FIG. 2 may include S201, S202, and S203.

It should be understood that FIG. 2 shows steps or operations of the method, but the steps or operations are merely examples. In this embodiment of this application, other operations or variations of the operations in FIG. 2 may be further performed. In addition, the steps in FIG. 2 may be performed in a sequence different from that presented in FIG. 2, and possibly, not all operations in FIG. 2 need to be performed.

S201: In a process in which an access network device serving a terminal is handed over from a source access network device to a target access network device, a user plane function network element determines to bicast downlink packets to the source access network device and the target access network device.

For example, a session management function network element delivers indication information or a forwarding rule to the user plane function network element. After receiving the indication information or the forwarding rule, the user plane function network element may determine that the user plane function network element needs to bicast the downlink packets to the source access network device and the target access network device.

That the user plane function network element bicasts the downlink packets to the source access network device and the target access network device may be understood as that the user plane function network element sends downlink packets received from a data network (DN) to the source access network device and the target access network device at the same time.

For example, the user plane function network element encapsulates the downlink packets received from the DN, and then sends encapsulated downlink packets to the source access network device and the target access network device.

For example, the user plane function network element encapsulates the downlink packets, to generate first downlink packets and second downlink packets, sends the first downlink packets to the source access network device, and sends the second downlink packets to the target access network device.

For example, the user plane function network element may add different general packet radio service (GPRS) tunneling protocol (tunneling protocol for the user plane, GTP-U) headers to the downlink packets received from the DN, to generate the first downlink packets and the second downlink packets, and send the first downlink packets and the second downlink packets to the source access network device and the target access network device respectively.

The user plane function network element may be the UPF network element 104, the terminal may be the UE 101, the source access network device may be the RAN device 102, and the target access network device may be the RAN device 103.

S202: The user plane function network element sends first information to the source access network device, where the first information is used to indicate that the user plane function network element bicasts the downlink packets to the source access network device and the target access network device.

In other words, after determining that the user plane function network element may bicast the downlink packets to the source access network device and the target access network device, the user plane function network element may send, to the source access network device, the first information indicating that the user plane function network element bicasts the downlink packets to the source access network device and the target access network device.

Optionally, when the user plane function network element sends the first information to the source access network device serving the terminal, the user plane function network element may have started to bicast the downlink packets to the source access network device and the target access network device. Correspondingly, the source access network device and the target access network device receive the downlink packets from the user plane function network element.

In this implementation, the user plane function network element may carry the first information only in downlink packets (for example, the first downlink packets) sent to the source access network device, or may carry the first information in all the downlink packets (for example, the first downlink packets and the second downlink packets) sent to the source access network device and the target access network device.

For example, the first information may be carried in the first one of the downlink packets bicast by the user plane function network element to the source access network device.

In this implementation, to improve transmission reliability of the first information, for example, to avoid a case in which the source access network device does not receive the first one of the downlink packets bicast by the user plane function network element and consequently does not receive the first information, the user plane function network element may carry the first information in the first N downlink packets sent to the source access network device.

In this implementation, the user plane function network element may set a flag bit in a GTP-U header of a packet to indicate the first information.

For example, flag bits may be set in GTP-U headers of the second downlink packets in step S201 to indicate the first information.

For example, a specific flag bit of a GTP-U header may be set to "0" or "1", to indicate that the user plane function network element bicasts the downlink packets to the source access network device and the target access network device, where "0" or "1" is the first information.

Optionally, the user plane function network element may send the first information to the source access network device serving the terminal before starting to bicast the downlink packets to the source access network device and the target access network device. In other words, the user plane function network element starts to bicast the downlink packets to the source access network device and the target access network device after sending the first information. Correspondingly, the source access network device and the target access network device receive the downlink packets from the user plane function network element.

For example, before bicasting the first one of the downlink packets, the user plane function network element may send, to the source access network device, one or more first downlink packets that carry the first information, to indicate that the bicast is about to start, and subsequently sent packets are bicast packets.

S203: The source access network device triggers an air interface handover after sending a data packet received before the first information to the terminal.

The air interface handover may be a Uu interface handover.

That the source access network device triggers an air interface handover may include: The source access network device sends a handover command message to the terminal, to instruct a terminal device to start to perform the handover; and/or, the source access network device stops sending downlink data to the terminal.

In this embodiment of this application, the user plane function network element sends the first information to the source access network device serving the terminal, to indicate starting of the bicast. After receiving the first information from the user plane function network element, and after sending the data packet received before the first information to the terminal, the source access network device triggers the air interface handover, to ensure that before the terminal device is handed over to the target access network device, the source access network device has sent a packet before the bicast starts to the terminal device, and prevents a packet loss in a handover process.

Figure 3:
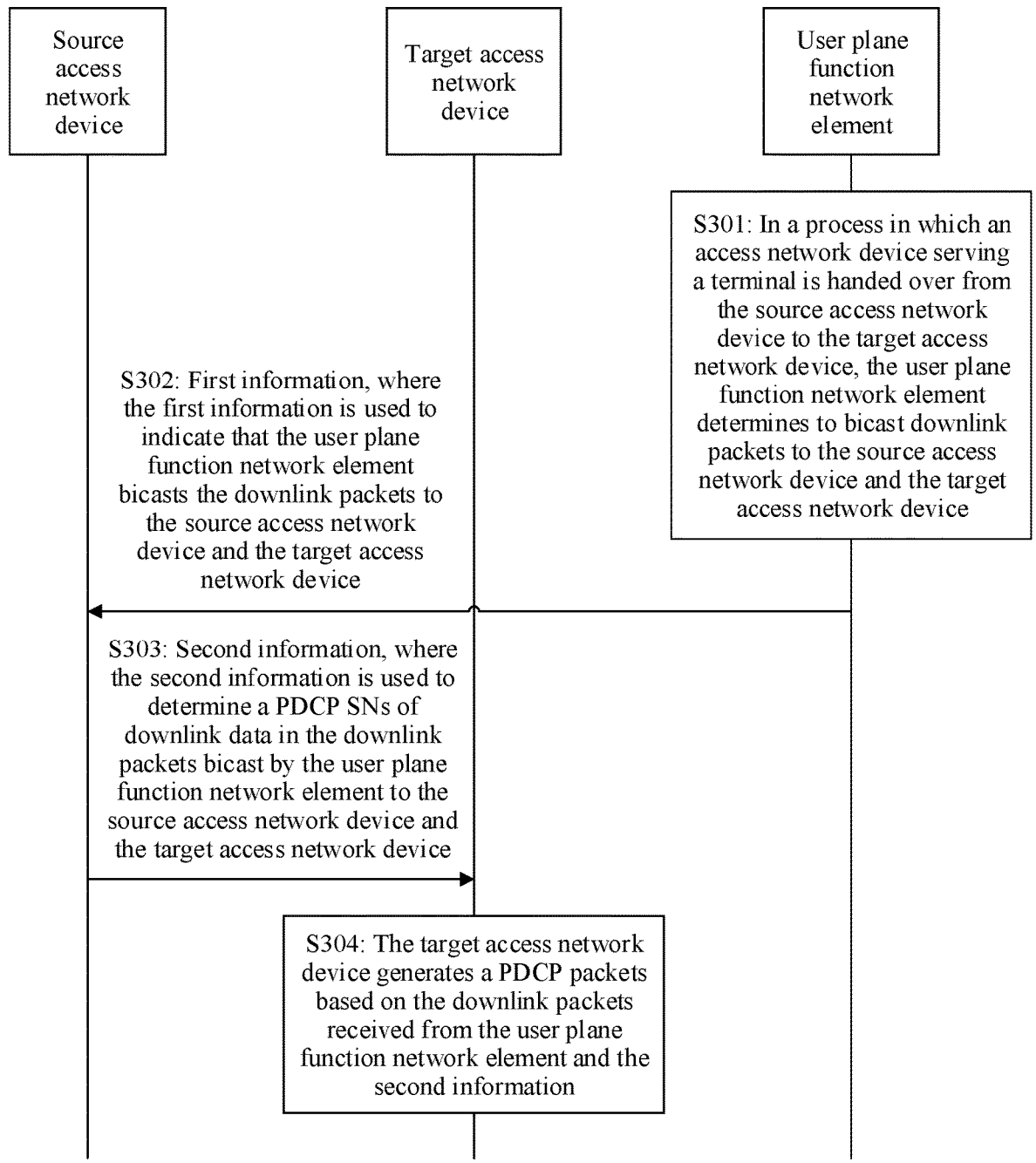
FIG. 3 is a schematic flowchart of a communication method according to another embodiment of this application.

FIG. 3 is a schematic flowchart of a communication method according to another embodiment of this application. The method shown in FIG. 3 may include S301, S302, S303 and S304.

It should be understood that FIG. 3 shows steps or operations of the method, but the steps or operations are merely examples. In this embodiment of this application, other operations or variations of the operations in FIG. 3 may be further performed. In addition, the steps in FIG. 3 may be performed in a sequence different from that presented in FIG. 3, and possibly, not all operations in FIG. 3 need to be performed.

S301: In a process in which an access network device serving a terminal is handed over from a source access network device to a target access network device, a user plane function network element determines to bicast downlink packets to the source access network device and the target access network device.

S302: The user plane function network element sends first information to the source access network device, where the first information is used to indicate that the user plane function network element bicasts the downlink packets to the source access network device and the target access network device.

For steps S301 and S302, refer to descriptions of S201 and S202 in FIG. 2 respectively. Details are not described herein again.

S303: The source access network device sends second information to the target access network device, where the second information is used to determine PDCP SNs of downlink data in the downlink packets bicast by the user plane function network element to the source access network device and the target access network device. Correspondingly, the target access network device receives the second information from the source access network device.

In other words, the second information is used by the target access network device to determine the PDCP SNs of the downlink data in the downlink packets bicast by the user plane function network element.

In other words, after detecting the first information, the source access network device may send the second information to the target access network device, so that the target access network device determines, based on the second information, the PDCP SNs of the downlink data in the downlink packets received from the user plane function network element. The downlink packets are the downlink packets bicast by the user plane function network element to the source access network device and the target access network device.

In some possible implementations, the second information may be carried in a sequence number status transfer (SN status transfer) message sent by the source access network device to the target access network device. In some possible implementations, the second information may include a PDCP SN allocated by the source access network device to the first bicast packet. In some possible implementations, the second information may include a PDCP SN allocated by the source access network device to a packet before the first bicast packet.

S304: The target access network device generates PDCP packets based on the second information received from the source access network device and the downlink packets received from the user plane function network element. The downlink packets include the downlink packets bicast by the user plane function network element to the source access network device and the target access network device.

For example, when the second information includes the PDCP SN allocated by the source access network device to the first bicast packet, the target access network device may allocate the PDCP SN to the first bicast downlink packet received from the user plane function network element.

When the second information includes the PDCP SN allocated by the source access network device to the packet before the first bicast packet, the target access network device may increase the PDCP SN by 1, and allocate the increased PDCP SN to the first bicast downlink packet received from the user plane function network element.

In this embodiment of this application, the user plane function network element sends the first information to the source access network device serving the terminal, to indicate starting of the bicast, so that the source access network device can synchronize downlink PDCP sequence numbers of the source access network device with downlink PDCP sequence numbers of the target access network device, and the target access network device can send PDCP packets encapsulated based on the sequence numbers to the terminal. In this way, the terminal can sort and deduplicate the received packets based on the sequence numbers in the received PDCP packets.

Optionally, the communication method shown in FIG. 3 may further include S203 in FIG. 2. Optionally, the communication method shown in FIG. 2 may further include S303 and/or S304 in FIG. 3.

Optionally, in the communication method shown in FIG. 2 or FIG. 3, the source access network device may start to detect the first information after receiving a handover command (Handover Command) sent by an access and mobility management function network element. The handover command is used to indicate that a core network side of the source access network device has completed user plane establishment and update. Alternatively, the source access network device may start to detect the first information after sending a handover required (Handover Required) message to an access and mobility management function network element. The handover required message is used to require the core network side to start to establish and update a user plane. Detecting the first information means that the source access network device detects whether the downlink packets received from the user plane function network element include the first information.

The access and mobility management function network element may be the AMF network element 105.

In the following, an example is used to describe a schematic flowchart of a communication method according to one of the embodiments of this application with reference to FIG. 4. In the example, an access and mobility management network element is an AMF network element, a session management function network element is an SMF network element, a user plane function network element is a UPF network element, a source access network device is an S-RAN device, and a target access network device is a T-RAN device. When UE is handed over from the S-RAN device to the T-RAN device, the S-RAN device and the T-RAN device exchange signaling messages through an Xn interface. The AMF network element and the SMF network element that are connected to the RAN device remain unchanged before and after the handover. GTP-U headers of downlink packets bicast by the UPF network element carry first information.

That the S-RAN device and the T-RAN device exchange signaling messages through an Xn interface may mean that the S-RAN device and the T-RAN device directly exchange signaling messages through the Xn interface between the S-RAN device and the T-RAN device.

Figure 4:
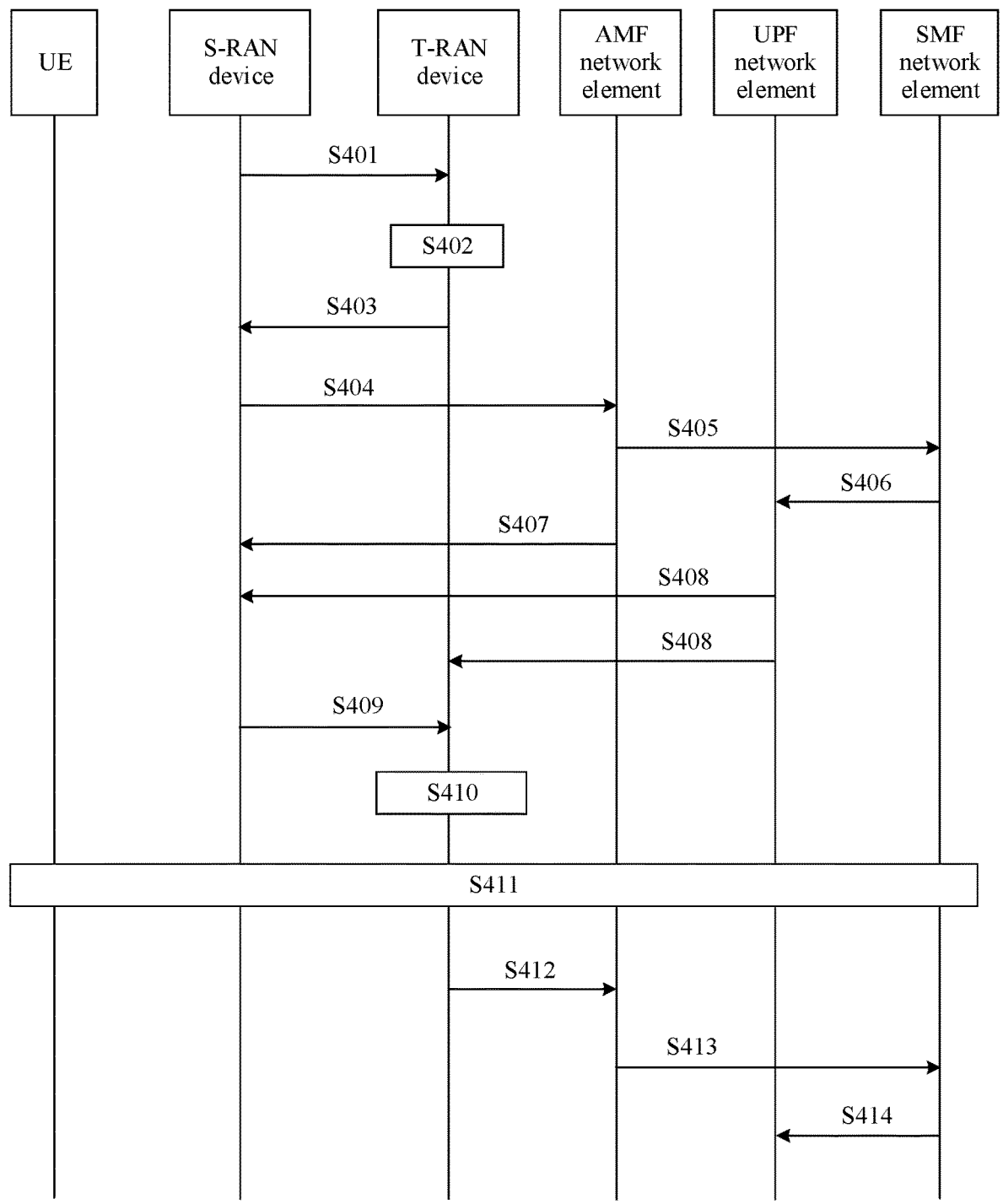
FIG. 4 is a schematic flowchart of a communication method according to another embodiment of this application.

It should be understood that FIG. 4 shows steps or operations of the method, but the steps or operations are merely examples. In this embodiment of this application, other operations or variations of the operations in FIG. 4 may be further performed. In addition, the steps in FIG. 4 may be performed in a sequence different from that presented in FIG. 4, and possibly, not all operations in FIG. 4 need to be performed.

S401: After determining, based on a measurement report received from a terminal device, that the terminal device meets a handover condition, the S-RAN device sends a handover request message to the T-RAN device.

S402: After receiving the handover request message, the T-RAN device performs admission control, and determines an accepted PDU session and a QoS flow included in the session.

S403: The T-RAN device sends a handover request acknowledge message to the S-RAN device. The message includes information about the T-RAN device. For example, the information about the T-RAN device in the step includes N3 tunnel information of the T-RAN device. The message may further include an identity of the accepted PDU session and an identity of the QoS flow included in the session.

S404: The S-RAN device sends a handover required (Handover Required) message to the AMF network element, where the message includes information about the T-RAN device. For example, the information about the T-RAN device in this step includes an identity (identity, ID) of the T-RAN device and the N3 tunnel information of the T-RAN device. The message may further include the identity of the accepted PDU session and the identity of the QoS flow included in the session.

S405: The AMF network element sends a PDU session context update request (Nsmf_PDU Session_UpdateSM-ContextRequest) message to the SMF network element, where the message includes the information about the T-RAN device obtained in step S404, the identity of the PDU session that can be accepted, and the identity of the QoS flow included in the session.

S406: The SMF network element determines, based on information included in the PDU session context update request message received from the AMF network element in step 405, that the downlink packets need to be bicast, and delivers indication information or a forwarding rule to the UPF network element based on the information about the T-RAN device, to indicate the UPF to start to bicast the downlink packets to the S-RAN and the T-RAN. The indication information or the forwarding rule is sent to the UPF network element through an N4 session modification request message.

S407: The AMF network element sends a handover command (Handover command) to the S-RAN, to indicate that a core network side of the S-RAN has completed handover preparation.

S408: After receiving the indication information or the forwarding rule, the UPF network element may determine to bicast the downlink packets to the S-RAN device and the T-RAN device, and bicast the downlink packets to the S-RAN device and the T-RAN device, where the downlink packets carry the first information.

For example, the UPF network element may carry the first information only in downlink packets sent to the S-RAN device, or may carry the first information in all the downlink packets sent to the S-RAN device and the T-RAN device.

For example, flag bits may be set in GTP-U headers of the downlink packets to carry the first information.

For example, a specific flag bit of a GTP-U header may be set to "0" or "1", to indicate that the user plane function network element bicasts the downlink packets to the source access network device and the target access network device, where "0" or "1" is the first information.

To improve reliability and avoid a case in which the S-RAN device cannot receive the first bicast packet and further cannot complete an indication of the UPF network element for bicast, the UPF network element may carry the first information in the first several bicast downlink packets.

After receiving the bicast downlink packets, the T-RAN device may buffer the downlink packets.

S409: After detecting the first information, the S-RAN device sends an SN status transfer message to the T-RAN device, where the message carries second information, so that the T-RAN device can determine, based on the second information, a PDCP SN that can be allocated to the first bicast packet.

S410: After receiving the second information from the S-RAN device, the T-RAN device encapsulates the buffered downlink packets by using PDCP SNs indicated by the second information, to obtain PDCP packets.

S411: After determining that a data packet received before the first information has been sent to the UE, the S-RAN device triggers the UE to perform an air interface handover, and the UE is handed over to the T-RAN device and completes an RRC handover process, that is, disconnects an air interface connection to the S-RAN device and establishes an air interface connection to the T-RAN device. The T-RAN starts to receive an uplink packet from the UE and sends a downlink packet to the UE.

It should be understood that there is no sequence between steps S407 and S408. That is, steps S407 and S408 may be performed simultaneously, S407 may be performed first, or S408 may be performed first. S411 is performed after both S407 and S408 are completed. There is no sequence between S411 and S409.

S412: The T-RAN device sends an N2 path switch request (N2 Path Switch Request) to the AMF network element.

S413: After receiving the N2 path switch request from the T-RAN device, the AMF network element sends a PDU session context update request to the SMF network element, to request the SMF network element to update a session context.

S414: After receiving the PDU session context update request from the AMF network element, the SMF network element sends the N4 session modification request to the UPF network element, to indicate the UPF network element to stop bicasting the downlink packets and forward a downlink packet of the UE only to the T-RAN device.

In the following, an example is used to describe a schematic flowchart of a communication method according to one of the embodiments of this application with reference to FIG. 5. In the example, an access and mobility management network element is an AMF network element, a session management function network element is an SMF network element, a user plane function network element is a UPF network element, a source access network device is an S-RAN device, and a target access network device is a T-RAN device. When UE is handed over from the S-RAN device to the T-RAN device, the S-RAN device and the T-RAN device exchange signaling through an Xn interface. The AMF network element and the SMF network element remain unchanged before and after the handover. First information is carried in a downlink packet sent before the bicast.

That the S-RAN device and the T-RAN device exchange signaling messages through an Xn interface may mean that the S-RAN device and the T-RAN device directly exchange signaling messages through the Xn interface between the S-RAN device and the T-RAN device.

Figure 5:
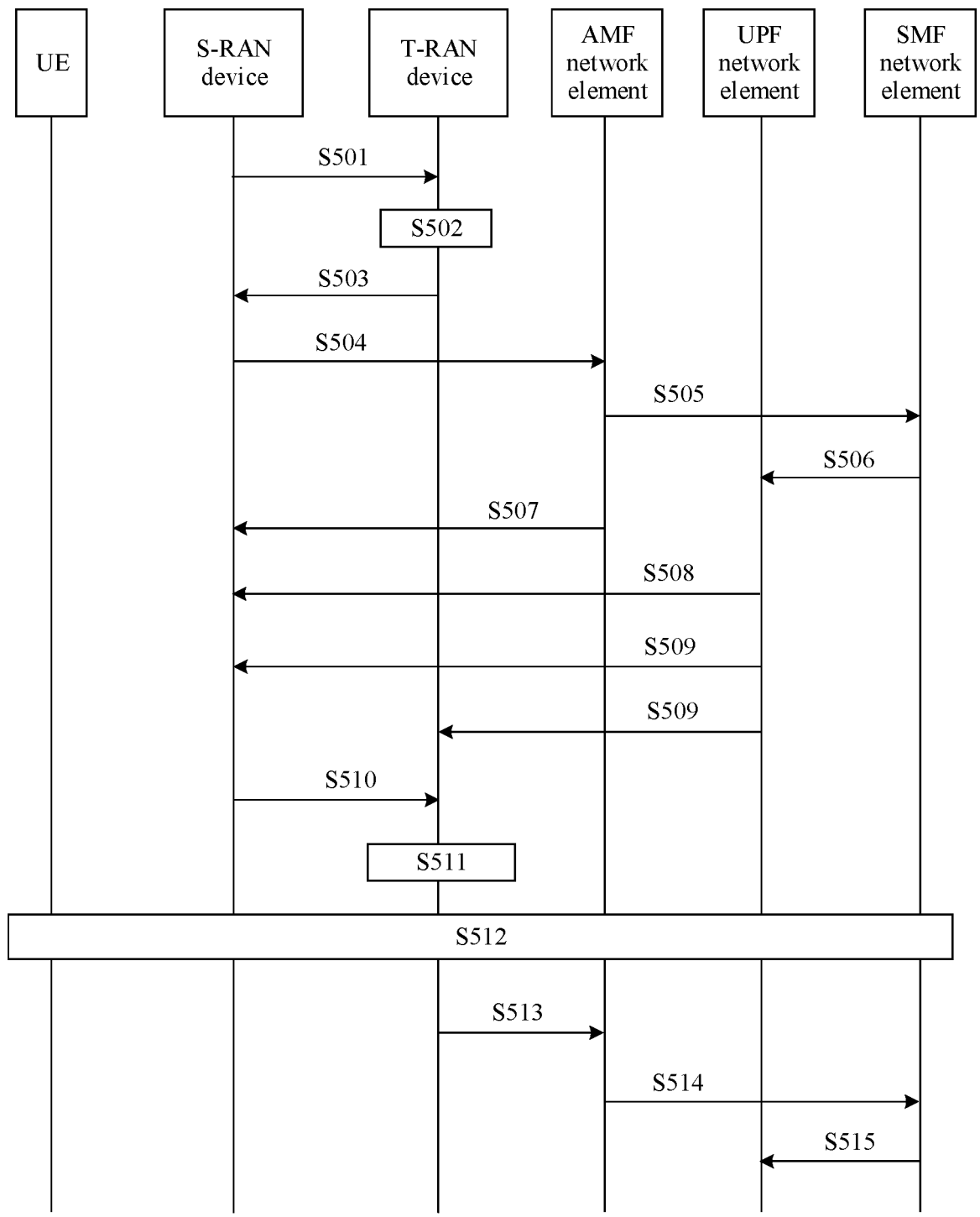
FIG. 5 is a schematic flowchart of a communication method according to another embodiment of this application.

It should be understood that FIG. 5 shows steps or operations of the method, but the steps or operations are merely examples. In this embodiment of this application, other operations or variations of the operations in FIG. 5 may be further performed. In addition, the steps in FIG. 5 may be performed in a sequence different from that presented in FIG. 5, and possibly, not all operations in FIG. 5 need to be performed.

For S501 to S507, refer to S401 to S407. Details are not described herein again.

S508: After receiving the indication information or the forwarding rule, the UPF network element may determine to bicast the downlink packets to the S-RAN device and the T-RAN device, the UPF network element sends one or more first downlink packets that carry the first information to the S-RAN device, to indicate starting of the bicast, and subsequently sent packets are bicast packets.

The first information may be carried in the first downlink packet. For example, if a first downlink packet is a GTP data packet, the first information may be set in a specific flag bit of a GTP-U header. For example, the specific flag bit is set to "0" or "1". In this case, the first information in the specific flag bit may also be referred to as an end marker. The end marker is used to indicate that the bicast is about to start, and the subsequently sent packets are the bicast packets. In addition to the specific flag bit, the GTP-U header of the first downlink data packet that carries first indication information further carries downlink GTP-U tunnel information of the session associated with the bicast packets transmitted between the S-RAN and the UPF network element.

S509: The UPF network element bicasts the downlink packets to the S-RAN device and the T-RAN device.

After receiving the bicast downlink packets, the T-RAN device may buffer the downlink packets.

For S510 to S515, refer to S409 to S414. Details are not described herein again.

It should be understood that the communication method shown in FIG. 4 or FIG. 5 may also be applied to a scenario in which either or both of the AMF network element and the SMF network element change. In this scenario, it only requires that the AMF network element or the SMF network element in FIG. 4 or FIG. 5 that changes be replaced with a changed AMF network element or SMF network element.

In the following, an example is used to describe a schematic flowchart of a communication method according to one of the embodiments of this application with reference to FIG. 6. In the example, an access and mobility management network element is an AMF network element, a session management function network element is an SMF network element, a user plane function network element is a UPF network element, a source access network device is an S-RAN device, and a target access network device is a T-RAN device. When UE is handed over from the S-RAN device to the T-RAN device, the S-RAN device and the T-RAN device exchange signaling messages through an N2 interface. The AMF network element and the SMF network element that are connected to the RAN device remain unchanged before and after the handover. GTP-U headers of downlink packets bicast by the UPF network element carry first information.

That the S-RAN device and the T-RAN device exchange signaling messages through an N2 interface may mean that message exchange between the S-RAN device and the T-RAN device is implemented by using the N2 interface. For example, the S-RAN device sends a message to the T-RAN. The S-RAN device sends the message to the AMF network element through the N2 interface, and then the AMF network element sends the message to the T-RAN device through the N2 interface.

Figure 6:
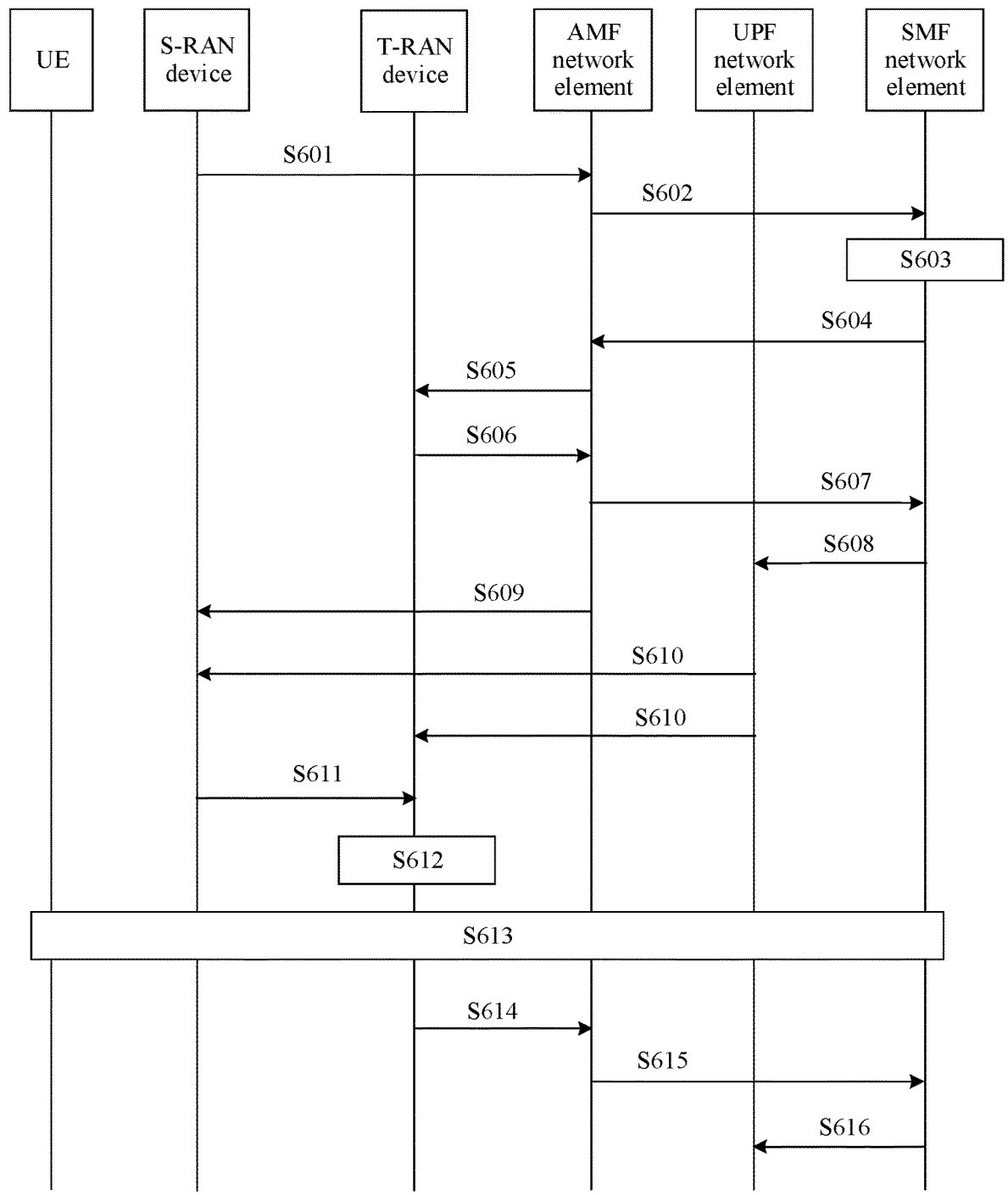
FIG. 6 is a schematic flowchart of a communication method according to another embodiment of this application.

It should be understood that FIG. 6 shows steps or operations of the method, but the steps or operations are merely examples. In this embodiment of this application, other operations or variations of the operations in FIG. 6 may be further performed. In addition, the steps in FIG. 6 may be performed in a sequence different from that presented in FIG. 6, and possibly, not all operations in FIG. 6 need to be performed.

S601: After determining, based on a measurement report received from a terminal device, that the terminal device meets a handover condition, the S-RAN device sends a handover required message to the AMF network element, where the handover required message includes information about the T-RAN device, for example, the handover required message may include a T-RAN device ID carried in the measurement report, and an identity of a PDU session that requires to be handed over.

S602: After receiving the handover required message, the AMF network element sends a PDU session context update request message to the SMF network element, where the message includes the information about the T-RAN device and the identity of the PDU session that requires to be handed over.

S603: The SMF network element determines, based on information included in the PDU session context update request message received from the AMF network element in step 602, a PDU session that can be accepted, and determines, based on a UPF selection criterion, whether an intermediate UPF network element needs to be added.

For ease of description, in this embodiment of this application, it is assumed that the intermediate UPF network element does not need to be added. It should be noted that the method in this embodiment of this application is also applicable to a scenario in which the intermediate UPF network element needs to be added.

S604: The SMF network element sends a PDU session context update response message to the AMF network element, where the message includes information about an identity of an accepted PDU session.

S605: After receiving the PDU session context update response message from the SMF network element, the AMF network element sends a handover request (Handover Request) message to the T-RAN device based on the T-RAN ID obtained in step 601, where the request message includes information received by the AMF network element from the SMF network element in step 504.

S606: The T-RAN device sends a handover request acknowledgment (Handover Request Acknowledge) message to the AMF network element, where the message includes the identity of the PDU session that is accepted by the T-RAN device and an identity of a QoS flow included in the session, and further includes N3 tunnel information of the T-RAN device.

S607: The AMF network element sends a PDU session context update request message to the SMF network element, where the message includes the N3 tunnel information of the T-RAN device, the identity of the PDU session that is accepted by the T-RAN device, and the identity of the QoS flow included in the session.

S608: The SMF network element determines, based on information included in the PDU session context update request message received from the AMF network element in step 607, that the downlink packets need to be bicast, and delivers indication information or a forwarding rule to the UPF network element based on the information about the T-RAN device, to indicate the UPF to start to bicast the downlink packets to the S-RAN and the T-RAN. The indication information or the forwarding rule is sent to the UPF network element through an N4 session modification request.

S609: The AMF network element sends a handover command to the S-RAN, to indicate that a core network side of the S-RAN has completed handover preparation.

S610: After receiving the indication information or the forwarding rule, the UPF network element may determine to bicast the downlink packets to the S-RAN device and the T-RAN device, and bicast the downlink packets to the S-RAN device and the T-RAN device, where the downlink packets carry the first information.

For example, the UPF network element may carry the first information only in downlink packets sent to the S-RAN device, or may carry the first information in all the downlink packets sent to the S-RAN device and the T-RAN device.

For example, flag bits may be set in GTP-U headers of the downlink packets to carry the first information.

For example, a specific flag bit of a GTP-U header may be set to "0" or "1", to indicate that the user plane function network element bicasts the downlink packets to the source access network device and the target access network device, where "0" or "1" is the first information.

To improve reliability and avoid a case in which the S-RAN device cannot receive the first bicast packet and further cannot complete an indication of the UPF network element for bicast, the UPF network element may carry the first information in the first several bicast downlink packets.

After receiving the bicast downlink packets, the T-RAN device may buffer the downlink packets.

S611: After detecting the first information, the S-RAN device sends an SN status transfer message to the T-RAN device, where the message carries second information, so that the T-RAN device can determine, based on the second information, a PDCP SN that can be allocated to the first bicast packet.

It should be noted that, because the S-RAN device interacts with the T-RAN device through the N2 interface, the SN status transfer message is also forwarded by the AMF network element, that is, the S-RAN device sends the SN status transfer message to the AMF network element, and then the AMF network element sends the SN status transfer message to the T-RAN device.

S612: After receiving the second information from the S-RAN device, the T-RAN device encapsulates the buffered downlink packets by using PDCP SNs indicated by the second information, to obtain PDCP packets.

S613: After determining that a data packet received before the first information has been sent to the UE, the S-RAN device triggers the UE to perform an air interface handover, and the UE is handed over to the T-RAN device and completes an RRC handover process, that is, disconnects an air interface connection to the S-RAN device and establishes an air interface connection to the T-RAN device. The T-RAN starts to receive an uplink packet from the UE and sends a downlink packet to the UE.

S614: The T-RAN device sends a handover notification message to the AMF.

S615: After receiving the handover notification message from the T-RAN device, an AMF device sends a PDU session context update request to an SMF device, to request the SMF device to update a session context.

S616: After receiving the PDU session context update request from the AMF device, the SMF device sends the N4 session modification request to the UPF, to indicate the UPF to stop bicasting the downlink packets and send a downlink packet of the UE only to the T-RAN device.

It should be understood that there is no sequence between steps S609 and S610. That is, steps S609 and S610 may be performed simultaneously, S609 may be performed first, or S610 may be performed first. S613 is performed after both S610 and S611 are completed. There is no sequence between S613 and S611.

In the following, an example is used to describe a schematic flowchart of a communication method according to one of the embodiments of this application with reference to FIG. 7. In the example, an access and mobility management network element is an AMF network element, a session management function network element is an SMF network element, a user plane function network element is a UPF network element, a source access network device is an S-RAN device, and a target access network device is a T-RAN device. When UE is handed over from the S-RAN device to the T-RAN device, the S-RAN device and the T-RAN device exchange signaling messages through an N2 interface. The AMF network element and the SMF network element remain unchanged before and after the handover. First information is carried in a downlink packet sent before the bicast.

That the S-RAN device and the T-RAN device exchange signaling messages through an N2 interface may mean that message exchange between the S-RAN device and the T-RAN device is implemented by using the N2 interface. For example, the S-RAN device sends a message to the T-RAN. The S-RAN device sends the message to the AMF network element through the N2 interface, and then the AMF network element sends the message to the T-RAN device through the N2 interface.

The first information may be carried in a first downlink packet. For example, if the first downlink packet is a GTP data packet, the first information may be set in a specific flag bit of a GTP-U header. For example, the specific flag bit is set to "0" or "1". In this case, the first information in the specific flag bit may also be referred to as an end marker. The end marker is used to indicate that the bicast is about to start, and the subsequently sent packets are the bicast packets. In addition to the specific flag bit, the GTP-U header of the first downlink data packet that carries a first indication information further carries downlink GTP-U tunnel information of the session associated with the bicast packets transmitted between the S-RAN and the UPF network element.

Figure 7:
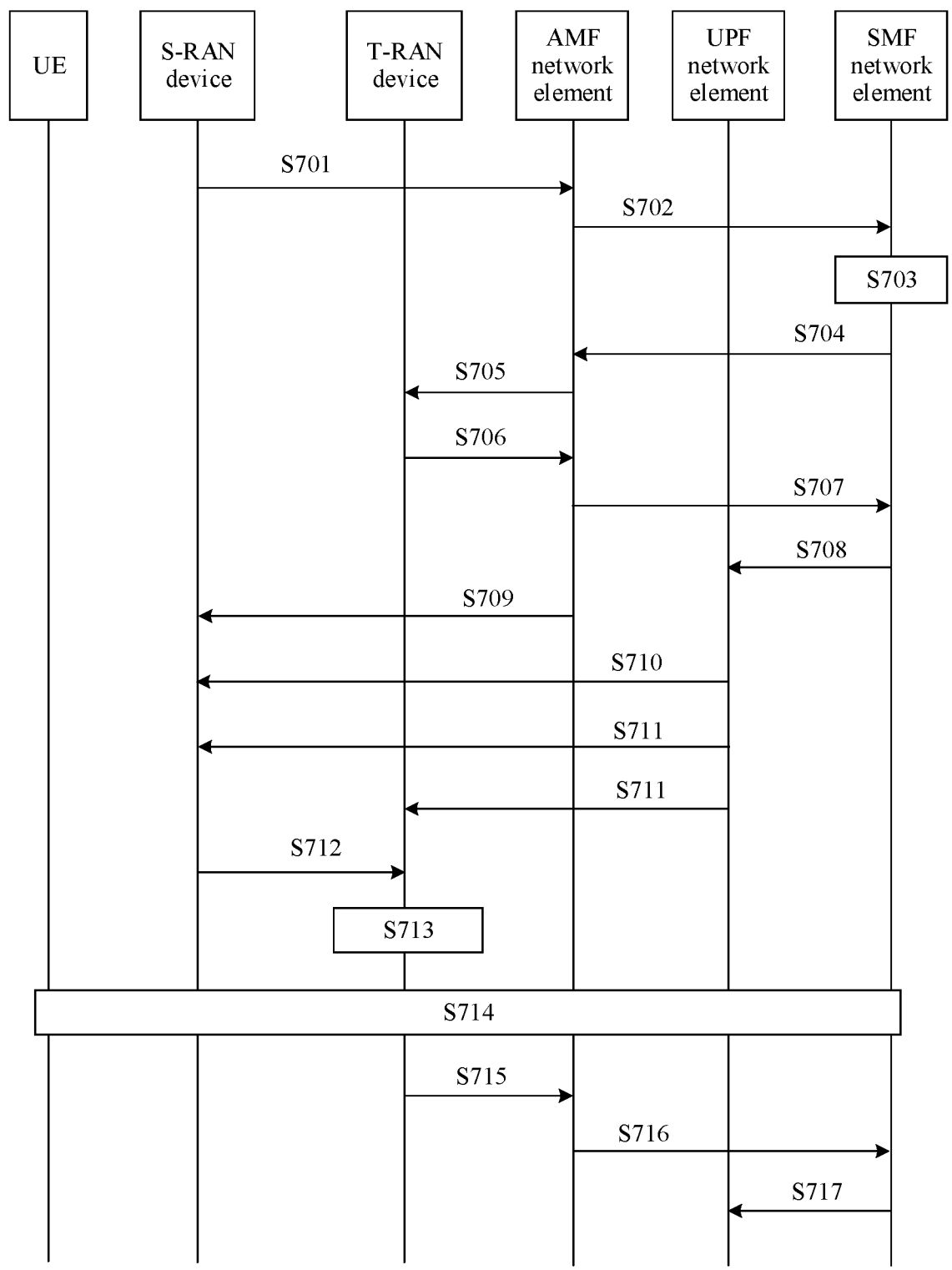
FIG. 7 is a schematic flowchart of a communication method according to another embodiment of this application.

It should be understood that FIG. 7 shows steps or operations of the method, but the steps or operations are merely examples. In this embodiment of this application, other operations or variations of the operations in FIG. 7 may be further performed. In addition, the steps in FIG. 7 may be performed in a sequence different from that presented in FIG. 7, and possibly, not all operations in FIG. 7 need to be performed.

For S701 to S709, refer to S601 to S609. Details are not described herein again.

For S710 and S711, refer to S508 and S509. Details are not described herein again.

For S712 to S717, refer to S611 to S616. Details are not described herein again.

It should be understood that the communication method shown in FIG. 6 or FIG. 7 may also be applied to a scenario in which the AMF network element changes. In this scenario, it only requires that the AMF network element in FIG. 6 or FIG. 7 be replaced with a target AMF network element, namely, a changed AMF network element. A message sent by the source access network device to the target AMF network element is forwarded by using a source AMF network element.

It should be understood that, in the communication methods shown in FIG. 4 to FIG. 7, the UPF network element may be an anchor UPF, namely, a PDU session anchor (PSA). The communication methods shown in FIG. 4 to FIG. 7 are also applicable to a case in which there is an intermediate UPF network element between an access network device and the anchor UPF network element. In this case, uplink packets and downlink packets are sent between the intermediate UPF network element and the access network device and between the intermediate UPF network element and the anchor UPF network element.

Figure 8:
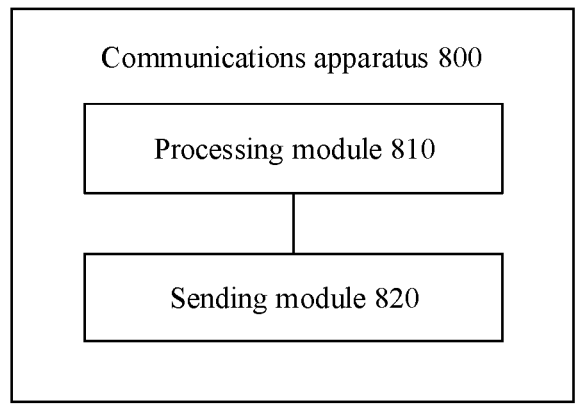
FIG. 8 is a schematic structural diagram of a communications apparatus according to an embodiment of this application.

FIG. 8 is a schematic block diagram of a communications apparatus 800 according to an embodiment of this application. It should be understood that the communications apparatus 800 is merely an example. The communications apparatus in this embodiment of this application may further include other modules or units, may include modules having functions similar to those of the modules in FIG. 8, or may not necessarily include all the modules in FIG. 8.

In some implementations, the communications apparatus 800 may be a user plane function network element.

A processing module 810 is configured to: in a process in which an access network device serving a terminal is handed over from a source access network device to a target access network device, determine to bicast downlink packets to the source access network device and the target access network device.

A sending module 820 is configured to send first information to the source access network device. The first information is used to indicate that the user plane function network element bicasts the downlink packets to the source access network device and the target access network device.

Optionally, the sending module is specifically configured to bicast the downlink packets to the source access network device and the target access network device. The downlink packets bicast by the user plane function network element to the source access network device include the first information.

Optionally, the first N downlink packets bicast by the communications apparatus to the source access network device all carry the first information, and N is a positive integer.

Optionally, the sending module is specifically configured to bicast the downlink packets to the source access network device and the target access network device after sending the first information.

The communications apparatus 800 may be configured to perform the steps performed by the user plane function network element in the methods described in FIG. 2 to FIG. 7. For brevity, details are not described herein again.

Figure 9:
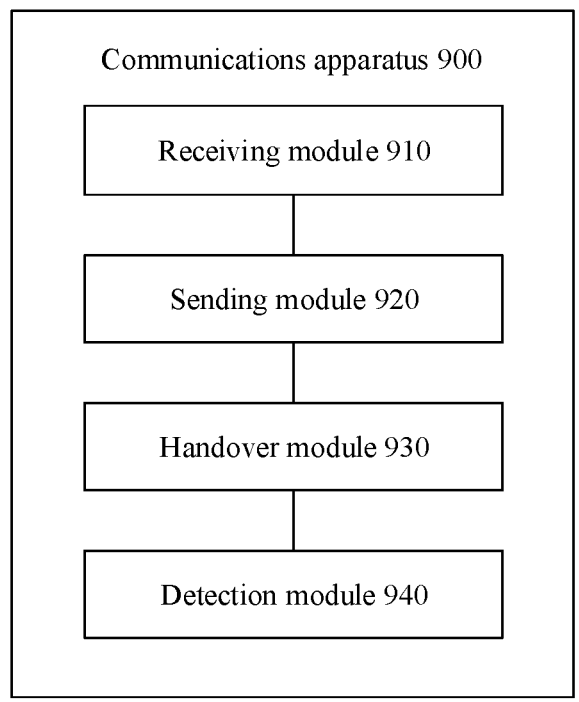
FIG. 9 is a schematic structural diagram of a communications apparatus according to another embodiment of this application.

FIG. 9 is a schematic block diagram of a communications apparatus 900 according to an embodiment of this application. It should be understood that the communications apparatus shown in FIG. 9 is merely an example. The communications apparatus in this embodiment of this application may further include other modules or units, may include modules having functions similar to those of the modules in FIG. 9, or may not necessarily include all the modules in FIG. 9.

In some implementations, the communications apparatus 900 may be an access network device.

A receiving module 910 is configured to: in a process in which the access network device serving a terminal is handed over from a source access network device to a target access network device, receive first information from a user plane function network element. The first information is used to indicate that the user plane function network element bicasts downlink packets to the source access network device and the target access network device.

A sending module 920 is configured to send second information to the target access network device after receiving the first information from the user plane function network element. The second information is used to determine packet data convergence protocol sequence numbers of downlink data in the downlink packets.

Optionally, the receiving module is specifically configured to receive the downlink packets bicast by the user plane function network element to the source access network device and the target access network device. The downlink packets bicast by the user plane function network element to the source access network device include the first information.

Optionally, the first N downlink packets bicast by the user plane function network element to the source access network device all carry the first information, and N is a positive integer.

Optionally, the receiving module is specifically configured to receive, after receiving the first information, the downlink packets bicast by the user plane function network element to the source access network device and the target access network device.

Optionally, the communication apparatus 900 further includes a handover module 930, configured to trigger an air interface handover after a data packet received before the first information is sent to the terminal.

Optionally, the handover module is specifically configured to send a handover command message to the terminal; or is specifically configured to stop sending downlink data to the terminal.

Optionally, the communications apparatus further includes a detection module 940, configured to start to detect whether the first information is received, after a handover command is received from an access and mobility management function network element, or after a handover required message is sent to the access and mobility management function network element.

The communications apparatus 900 may be configured to perform the steps performed by the source access network device in the methods described in FIG. 2 to FIG. 7. For brevity, details are not described herein again.

Figure 10:
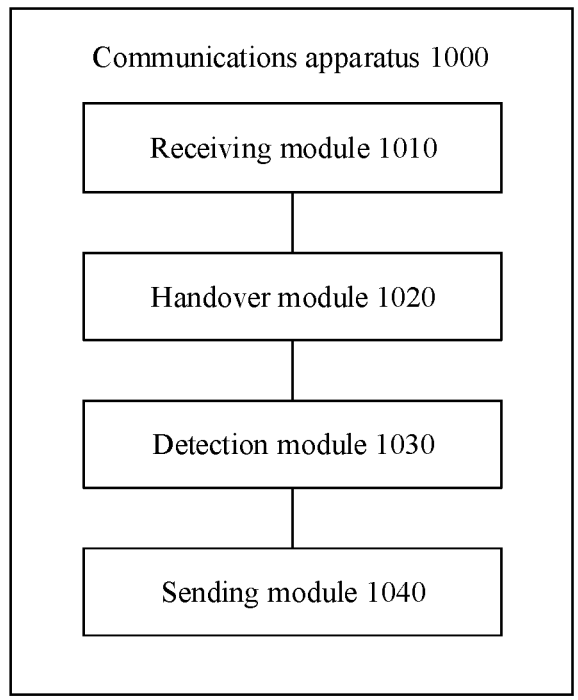
FIG. 10 is a schematic structural diagram of a communications apparatus according to another embodiment of this application.

FIG. 10 is a schematic block diagram of a communications apparatus 1000 according to an embodiment of this application. It should be understood that the communications apparatus shown in FIG. 10 is merely an example. The communications apparatus in this embodiment of this application may further include other modules or units, may include modules having functions similar to those of the modules in FIG. 10, or may not necessarily include all the modules in FIG. 10.

In some implementations, the communications apparatus 1000 may be an access network device.

A receiving module 1010 is configured to: in a process in which the access network device serving a terminal is handed over from a source access network device to a target access network device, receive first information from a user plane function network element. The first information is used to indicate that the user plane function network element bicasts downlink packets to the source access network device and the target access network device.

A handover module 1020 is configured to trigger an air interface handover after a data packet received before the first information is sent to the terminal.

Optionally, the handover module is specifically configured to send a handover command message to the terminal; or is specifically configured to stop sending downlink data to the terminal.

Optionally, the receiving module is specifically configured to receive the downlink packets bicast by the user plane function network element to the source access network device and the target access network device. The downlink packets bicast by the user plane function network element to the source access network device include the first information.

Optionally, the first N downlink packets bicast by the user plane function network element to the source access network device all carry the first information, and N is a positive integer.

Optionally, the receiving module is specifically configured to receive, after receiving the first information, the downlink packets bicast by the user plane function network element to the source access network device and the target access network device.

Optionally, the communications apparatus 1000 further includes a detection module 1030, configured to start to detect whether the first information is received, after a handover command is received from an access and mobility management function network element, or after a handover required message is sent to the access and mobility management function network element.

Optionally, the communications apparatus 1000 further includes a sending module 1040, configured to send second information to the target access network device. The second information is used to determine packet data convergence protocol sequence numbers of downlink data in the downlink packets.

The communications apparatus 1000 may be configured to perform the steps performed by the source access network device in the methods described in FIG. 2 to FIG. 7. For brevity, details are not described herein again.

Figure 11:
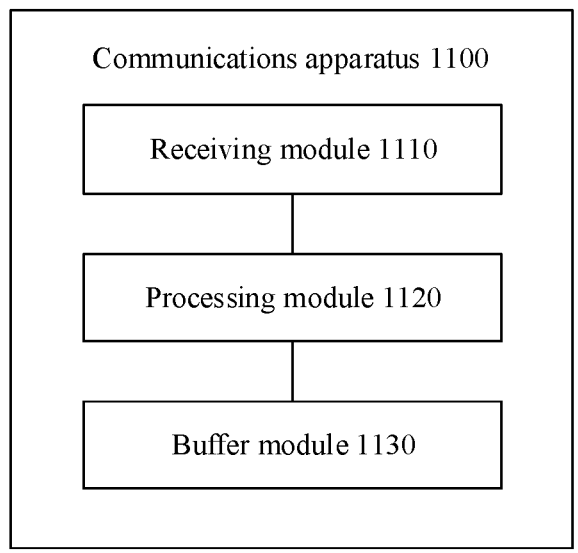
FIG. 11 is a schematic structural diagram of a communications apparatus according to another embodiment of this application.

FIG. 11 is a schematic block diagram of a communications apparatus 1100 according to an embodiment of this application. It should be understood that the communications apparatus shown in FIG. 11 is merely an example. The communications apparatus in this embodiment of this application may further include other modules or units, may include modules having functions similar to those of the modules in FIG. 11, or may not necessarily include all the modules in FIG. 11.

In some implementations, the communications apparatus 1100 may be an access network device.

A receiving module 1110 is configured to: in a process in which the access network device serving a terminal is handed over from a source access network device to a target access network device, receive, from a user plane function network element, downlink packets bicast by the user plane function network element to the source access network device and the target access network device.

The receiving module 1110 is further configured to receive second information from the source access network device, where the second information is used to determine packet data convergence protocol sequence numbers of downlink data in the downlink packets.

A processing module 1120 is configured to generate packet data convergence protocol packets based on the second information and the downlink packets.

Optionally, the communications apparatus further includes a buffer module 1130, configured to buffer the downlink packets before the second information is received.

The communications apparatus 1100 may be configured to perform the steps performed by the target access network device in the methods described in FIG. 2 to FIG. 7. For brevity, details are not described herein again.

Figure 12:
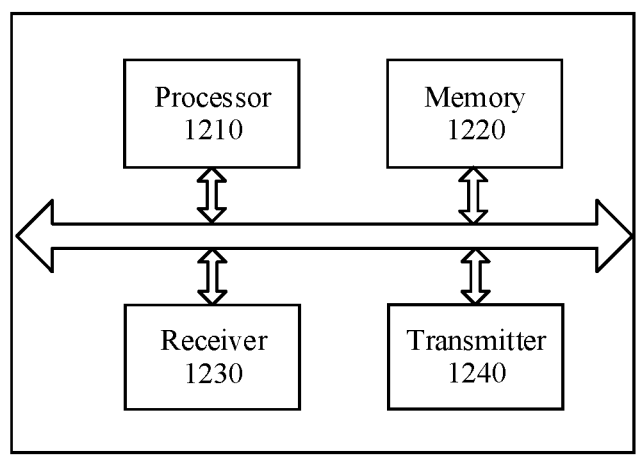
FIG. 12 is a schematic structural diagram of a communications apparatus according to another embodiment of this application.

FIG. 12 is a schematic structural diagram of a communications apparatus according to another embodiment of this application. It should be understood that the communications apparatus 1200 shown in FIG. 12 is merely an example. The communications apparatus in this embodiment of this application may further include other modules or units, or may include modules having functions similar to those of the modules in FIG. 12.

The communications apparatus 1200 may include one or more processors 1210, one or more memories 1220, a receiver 1230, and a transmitter 1240. The receiver 1230 and the transmitter 1240 may be integrated together to obtain a transceiver. The memory 1220 is configured to store program code executed by the processor 1210. The processor 1210 may be integrated with the memory 1220, or the processor 1210 is coupled to one or more memories 1220, and is configured to invoke an instruction in the memory 1220.

In an embodiment, the processor 1210 may be configured to implement operations or steps that can be implemented by the processing module 810 in FIG. 8. The transmitter 1240 may be configured to implement operations or steps that can be implemented by the sending module 820 in FIG. 8.

In another embodiment, the processor 1210 may be configured to implement operations or steps that can be implemented by the handover module 930 and the detection module 940 in FIG. 9. The receiver 1230 may be configured to implement operations or steps that can be implemented by the receiving module 910 in FIG. 9. The transmitter 1240 may be configured to implement operations or steps that can be implemented by the sending module 920 in FIG. 9.

In another embodiment, the processor 1210 may be configured to implement operations or steps that can be implemented by the handover module 1020 and the detection module 1030 in FIG. 10. The receiver 1230 may be configured to implement operations or steps that can be implemented by the receiving module 1010 in FIG. 10. The transmitter 1240 may be configured to implement operations or steps that can be implemented by the sending module 1040 in FIG. 10.

In still another embodiment, the processor 1210 may be configured to implement operations or steps that can be implemented by the processing module 1120 in FIG. 11. The receiver 1230 may be configured to implement operations or steps that can be implemented by the receiving module 1110 in FIG. 11. The memory 1220 is configured to store program code executed by the processor 1210, and implement operations or steps that can be implemented by the buffer module 1130 in FIG. 11.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings, direct couplings, or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for enabling a computer device (may be a personal computer, a server, a network device, or the like) to perform all or some of the steps of the methods according to the embodiments of this application. The storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method performed during a process in which an access network device serving a terminal is handed over from a source access network device to a target access network device, the communication method comprising:
   determining, by a user plane function network element, to bicast downlink packets to the source access network device and the target access network device; and
   sending, by the user plane function network element, first information to the source access network device, wherein the first information indicates that the user plane function network element bicasts the downlink packets to the source access network device and the target access network device.

2. The communication method according to claim 1, wherein the sending, by the user plane function network element, the first information to the source access network device comprises:
   bicasting, by the user plane function network element, the downlink packets to the source access network device and the target access network device,
   wherein the downlink packets bicast by the user plane function network element to the source access network device comprise the first information.

3. The communication method according to claim 2, wherein a quantity N of the first downlink packets bicast by the user plane function network element to the source access network device all carry the first information, and N is a positive integer.

4. The communication method according to claim 1, wherein the communication method further comprises:
   bicasting, by the user plane function network element, the downlink packets to the source access network device and the target access network device after sending the first information.

5. A communication method performed during a process in which an access network device serving a terminal is handed over from a source access network device to a target access network device, the communication method comprising:
   receiving, by the source access network device, first information from a user plane function network element, wherein the first information indicates that the user plane function network element bicasts downlink packets to the source access network device and the target access network device; and
   triggering, by the source access network device, an air interface handover after sending a data packet received before the first information to the terminal.

6. The communication method according to claim 5, wherein the triggering, by the source access network device, the air interface handover comprises:
   sending, by the source access network device, a handover command message to the terminal; or
   stopping, by the source access network device, sending downlink data to the terminal.

7. The communication method according to claim 5, wherein the receiving, by the source access network device, the first information from the user plane function network element comprises:
   receiving, by the source access network device, the downlink packets bicast by the user plane function network element to the source access network device and the target access network device, wherein the downlink packets bicast by the user plane function network element to the source access network device comprise the first information.

8. The communication method according to claim 7, wherein the first N downlink packets bicast by the user plane function network element to the source access network device all carry the first information, and N is a positive integer.

9. The communication method according to claim 5, wherein the communication method further comprises:

receiving, by the source access network device after receiving the first information, the downlink packets bicast by the user plane function network element to the source access network device and the target access network device.

10. The communication method according to claim 5, wherein the communication method further comprises:
starting, by the source access network device, to detect whether the first information is received, after receiving a handover command from an access and mobility management function network element, or after sending a handover required message to the access and mobility management function network element.

11. A communications apparatus operating during a process in which an access network device serving a terminal is handed over from a source access network device to a target access network device, comprising:
a processor, configured to determine to bicast downlink packets to the source access network device and the target access network device; and
a transmitter, configured to send first information to the source access network device, wherein the first information indicates that a user plane function network element bicasts the downlink packets to the source access network device and the target access network device.

12. The communications apparatus according to claim 11, wherein the transmitter is specifically configured to bicast the downlink packets to the source access network device and the target access network device, wherein the downlink packets bicast by the user plane function network element to the source access network device comprise the first information.

13. The communications apparatus according to claim 12, wherein a quantity N of the first downlink packets bicast by the communications apparatus to the source access network device all carry the first information, and N is a positive integer.

14. The communications apparatus according to claim 11, wherein the transmitter is specifically configured to bicast the downlink packets to the source access network device and the target access network device after sending the first information.

* * * * *